Dec. 28, 1926.   J. BAMFORD ET AL   1,612,251
DRIVING GEAR FOR CONVERGING SHAFTS
Filed Sept. 10, 1923
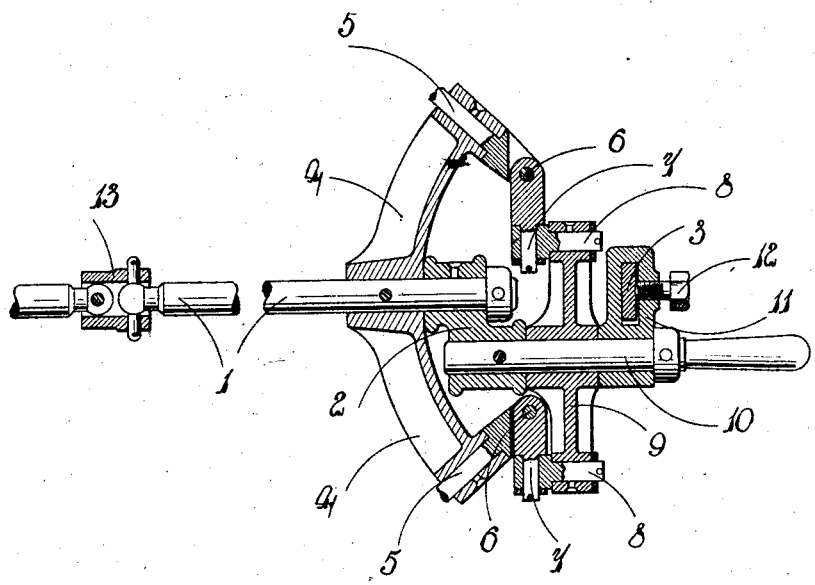
Inventors
Joseph Bamford
Cyril Joseph Bamford
by B Singer Atty Patented Dec. 28, 1926.

1,612,251

UNITED STATES PATENT OFFICE.

JOSEPH BAMFORD AND CYRIL JOSEPH BAMFORD, OF UTTOXETER, ENGLAND.

DRIVING GEAR FOR CONVERGING SHAFTS.

Application filed September 10, 1923, Serial No. 661,935, and in Great Britain November 20, 1922.

This invention relates to driving gear for converging shafts and refers more particularly to that kind of driving gear which comprises a driving shaft universally jointed near one end carrying a rotating head near the other end, the rotating head carrying the converging shafts, which are each connected by links to an eccentric disc mounted on a fixed crank at the end of said driving shaft. Shafts arranged in this manner are used in certain agricultural machines such as swath turners, side delivery rakes and the like.

The primary object of the present invention is to provide certain improvements in this type of apparatus which will render the machine easy to manufacture and will allow of a strong and durable construction.

According to the present invention, the driving gear comprises a driving shaft; a universal joint at one end of said driving shaft; a fixed crank separate from but located on the other end of said driving shaft; a driving disc in driving connection with said driving shaft; converging tine-carrying pins in said driving disc; tines associated with said pins; crank pins pivotally mounted on said converging pins; an eccentric disc rotatably mounted upon the fixed crank; and controlling pins mounted parallel to the driving shaft in said eccentric disc and rotatable therewith, the controlling pins being connected to the crank pins so that the latter can swivel therein.

The fixed crank or cam member is supported by a connection to a transverse bar, which connection can be adjusted along the bar as required, and the said crank or cam member and the adjacent end of the driving shaft interengage so that they are mutually supporting.

An example of the general type of machine to which this invention relates is shewn in our British specification No. 187,792.

Referring to the drawing:—This illustrates the controlling head only, the figure being a sectional side view.

In the construction illustrated, the rear end of the driving shaft 1 is universally jointed at 13 and is driven by driving mechanism from the rear wheels of the machine. The forward end of the driving shaft is rotatably mounted in the fixed crank or cam 2 which is supported by the transverse bar 3 of the machine. Instead, however, of mounting the forward end of the driving shaft 1 in this manner it may be supported by connecting it to the rotating head or disc 4, in which case the rotating head or disc 4 is supported upon a pin or projection provided upon the fixed crank or cam member 2.

The rotating head or disc 4 in either case is driven by the shaft 1, and this rotating head or disc is provided with converging pins 5 with which are associated the tines 14 in the well-known way. The ends of these pins project in advance of the rotating head or disc, and are there pivoted at 6 to crank pins 7 which are mounted to swivel in pins 8 carried by the disc 9 which is eccentric to the driving shaft 1 and which rotates upon a stub shaft 10 in the fixed crank or cam 2.

Any suitable form of connection may be provided between the fixed crank or the cam 2 and the transverse supporting bar 3 of the machine, but this connection must permit of the adjustment of the element as a whole, which adjustment takes place about the universal joint at the rear end of the driving shaft. The means shewn consist of a fitting 11 having a set screw 12 for locking it in any adjusted position along the bar 3.

What we claim then is:—

1. Driving gear for shafts arranged in converging relationship around a centre, comprising a driving shaft; a universal joint at one end of said driving shaft; a fixed crank separate from but located on the other end of said driving shaft; a stub shaft in said crank; means for adjustably supporting said stub shaft on the machine; an eccentric disc rotatably mounted on said stub shaft; a driving disc in driving connection with said driving shaft; converging pins in said driving disc; crank pins pivotally mounted on said converging pins; and controlling pins mounted parallel to the driving shaft in said eccentric disc and rotatable therewith, a swivelling connection between each crank pin and its associated controlling pin, said connection comprising a shank upon the one pin engaging an eye upon the other pin.

2. Driving gear for shafts arranged in converging relationship around a centre, comprising a driving shaft; a universal joint at one end of said driving shaft; a fixed crank separate from but located on the other end of said driving shaft; a stub shaft in said crank extending parallel to said driving shaft; a bracket supporting one end of said stub shaft; an eccentric disc rotatably mounted on said stub shaft; a driving disc in driving connection with said driving shaft; converging pins in said driving disc; crank pins pivotally mounted on said converging pins; and eyed controlling pins parallel to the driving shaft mounted in said eccentric disc and rotatable therewith, the eyes serving to receive the crank pins so that the latter can swivel therein.

In witness whereof we affix our signatures.
    JOSEPH BAMFORD.
    CYRIL JOSEPH BAMFORD.